(12) United States Patent
Kobayashi et al.

(10) Patent No.: US 10,837,923 B2
(45) Date of Patent: Nov. 17, 2020

(54) X-RAY ANALYSIS DEVICE AND METHOD FOR OPTICAL AXIS ALIGNMENT THEREOF

(71) Applicant: RIGAKU CORPORATION, Tokyo (JP)

(72) Inventors: Shintaro Kobayashi, Tokyo (JP); Katsuhiko Inaba, Kanagawa (JP); Toru Mitsunaga, Tokyo (JP)

(73) Assignee: RIGAKU CORPORATION, Tokyo (JP)

( * ) Notice: Subject to any disclaimer, the term of this patent is extended or adjusted under 35 U.S.C. 154(b) by 0 days.

(21) Appl. No.: 16/452,707

(22) Filed: Jun. 26, 2019

(65) Prior Publication Data

US 2020/0003708 A1 Jan. 2, 2020

(30) Foreign Application Priority Data

Jun. 29, 2018 (JP) .................................. 2018-125106

(51) Int. Cl.
*G01N 23/20* (2018.01)
*G01N 23/2055* (2018.01)
(Continued)

(52) U.S. Cl.
CPC ....... *G01N 23/2055* (2013.01); *G01N 23/207* (2013.01); *G01N 23/20025* (2013.01); *G01N 2223/5015* (2013.01)

(58) Field of Classification Search
CPC ......... G01N 23/207; G01N 2223/3301; G01N 2223/316; G01N 2223/3305; G01N 2223/5015; G01N 23/20; G01N 23/20008; G01N 23/20016; G01N 23/20025; G01N 23/2055; G01N 23/201; G01N 2223/61; G01N 23/041; G01N 23/05; G01N 23/205; G01N 1/28; G01N 35/08; G01N 2223/6116; G01N 23/223; G01N 2223/056;
(Continued)

(56) References Cited

U.S. PATENT DOCUMENTS

| 6,665,372 | B2 | 12/2003 | Bahr et al. | |
| 2003/0043965 | A1* | 3/2003 | Bahr | G01N 23/20 378/70 |

(Continued)

FOREIGN PATENT DOCUMENTS

JP H09-49811 A 2/1997

*Primary Examiner* — Irakli Kiknadze
(74) *Attorney, Agent, or Firm* — Cantor Colburn LLP

(57) ABSTRACT

To provide an X-ray analysis device and a method for optical axis alignment thereof by which measurement time is shortened and measurement cost may be reduced without optical axis alignment at each measurement using an analyzer. The X-ray analysis device includes a sample stage for supporting a sample, an N-dimensional detector, and an analyzer including analyzer crystals. A detection surface of the N-dimensional detector has first and second detection areas, a plurality of optical paths includes a first optical path that directly reaches the first detection area and a second optical path that reaches via the analyzer crystals, and the N-dimensional detector performs a measurement of the first optical path by X-ray detection of the first detection area, and performs a measurement of the second optical path by X-ray detection of the second detection area.

5 Claims, 3 Drawing Sheets

(51) Int. Cl.
*G01N 23/207* (2018.01)
*G01N 23/20025* (2018.01)

(58) Field of Classification Search
CPC ....... G01N 2223/054; G01N 2223/315; G01N 2223/308; G01N 2223/646; G01N 2223/6462; G01N 2223/076; G01N 2223/301; G01N 2223/304; G01N 2223/306; G21K 1/06; G21K 1/062; G21K 1/02; G01C 9/00
USPC .................................. 378/70, 71, 79, 81, 84
See application file for complete search history.

(56) References Cited

U.S. PATENT DOCUMENTS

| | | | | |
|---|---|---|---|---|
| 2006/0153332 | A1* | 7/2006 | Kohno | G21K 1/06 378/82 |
| 2007/0086567 | A1* | 4/2007 | Kataoka | G01N 23/2209 378/45 |
| 2008/0095311 | A1* | 4/2008 | Zheng | G01N 23/20 378/71 |
| 2008/0310587 | A1* | 12/2008 | Hegeman | G01N 23/223 378/44 |
| 2011/0268251 | A1* | 11/2011 | He | G01N 23/207 378/71 |
| 2017/0191950 | A1* | 7/2017 | Osakabe | G21K 1/04 |

* cited by examiner

X-RAY ANALYSIS DEVICE AND METHOD FOR OPTICAL AXIS ALIGNMENT THEREOF

CROSS-REFERENCE TO RELATED APPLICATION

This application claims the benefit of priority under 35 U.S.C. § 119 to Japanese Patent Application No. 2018-125106, filed Jun. 29, 2018, the contents of which are incorporated herein by reference in their entirety.

BACKGROUND

This invention relates to an X-ray analysis device and a method for optical axis alignment, and specifically to a useful technique for measurement using an analyzer.

For improvement of resolution at an X-ray receiving side, an analyzer using an analyzer crystal as an X-ray receiving optical component provided in an X-ray analysis device such as an X-ray diffractometer is employed.

U.S. Pat. No. 6,665,372 discloses an X-ray diffractometer. In the disclosure, one or two analyzer crystals are placed between the sample disposed in the position 1 and the detector disposed in the position 2, and thereby, two optical paths are realized. In one optical path a diffracted X-ray from the sample directly enters the detector, and in the other optical path the diffracted X-ray enters the detector via the one or two analyzer crystals.

JP H09-49811 (A) discloses an X-ray diffractometer. In the disclosure, two channel-cut crystals (four crystals) each including opposed two parallel reflection surfaces (i.e., two analyzer crystals) are provided, and two optical paths are realized by rotation of the respective four reflection surfaces.

SUMMARY OF THE INVENTION

Measurement with higher resolution can be made using the analyzer crystal, and thus, it is desirable that the analyzer is placed on the optical path between the sample and the detector when the measurement with higher resolution is made. However, when the analyzer is placed when the crystal orientation is adjusted before the measurement, the determination of the orientation is harder because the resolution at the diffraction angle (2θ) is too high. Accordingly, when the orientation is adjusted, generally, the analyzer is removed from the optical path and the resolution is made lower. Steps of attaching and detaching the analyzer are necessary and optical axis alignment is necessary at each time of the attachment of the analyzer, and increase in measurement time and increase in measurement cost are caused.

To avoid the attachment step, in the X-ray diffractometer disclosed in JP H09-49811 A, the reflection surfaces of the channel-cut crystals are rotated and the reflection surfaces are irradiated with the diffracted X-ray. Even in this case, optical axis alignment of the X-ray is necessary at each time when the reflection surfaces of the channel-cut crystals are rotated and the reflection surfaces are irradiated with the diffracted X-ray. The step of optical axis alignment of the X-ray requires a lot of time and effort, and thereby, the degree of freedom of measurement is lowered and increase in measurement time and increase in measurement cost are caused.

Further, in the X-ray diffractometer disclosed in U.S. Pat. No. 6,665,372, it is necessary to use a shutter for selecting one of the two optical paths.

The invention has been achieved in view of the above described problems, and an object is to provide an X-ray analysis device and an adjustment method thereof by which the measurement time is shortened and the measurement cost may be reduced without optical axis alignment at each measurement using the analyzer.

In order to solve the above described problems, an X-ray analysis device according to the invention includes a sample stage for supporting a sample, an N-dimensional detector (N is an integer of one or two), and an analyzer including one or more analyzer crystals, wherein a detection surface of the N-dimensional detector has a first detection area and a second detection area placed apart from the first detection area and distinguished from the first detection area for detection, a plurality of optical paths in which a diffracted X-ray from the sample travels includes a first optical path that directly reaches the first detection area and a second optical path that reaches via the one or more analyzer crystals, and the N-dimensional detector performs a measurement of the first optical path by X-ray detection of the first detection area, and performs a measurement of the second optical path by X-ray detection of the second detection area.

In the X-ray analysis device according to the above-described embodiment, the second optical path may be reflected at an even number of times in the one or more analyzer crystals.

In the X-ray analysis device according to the above-described embodiments, a relative position of the N-dimensional detector and the analyzer may be fixed.

A method for optical axis alignment of an X-ray analysis device according to the invention is a method for optical axis alignment of an X-ray analysis device including an X-ray source, a sample stage for supporting a sample, an N-dimensional detector (N is an integer of one or two), and an analyzer including one or more analyzer crystals, a detection surface of the N-dimensional detector has a first detection area and a second detection area placed apart from the first detection area and distinguished from the first detection area for detection, and a plurality of optical paths in which a diffracted X-ray from the sample travels includes a first optical path that directly reaches the first detection area and a second optical path that reaches via the one or more analyzer crystals, and the method includes a step of adjusting placement and/or orientation of the one or more analyzer crystals in an angular placement as a reference.

According to the invention, an X-ray analysis device and a method for optical axis alignment thereof by which the measurement time is shortened and the measurement cost is reduced without optical axis alignment at each measurement using the analyzer is provided.

DETAILED DESCRIPTION

As below, an embodiment of the invention will be explained with reference to the drawings. Note that, for clearer explanation, the drawings may be schematically shown regarding dimensions, shapes, etc. compared to the actual forms, however, these are only examples and do not limit the interpretation of the invention. Further, in this specification and the respective drawings, the same elements as those described in relation to the previously mentioned drawings may have the same signs and the detailed explanation may be omitted as appropriate.

Figure 1:
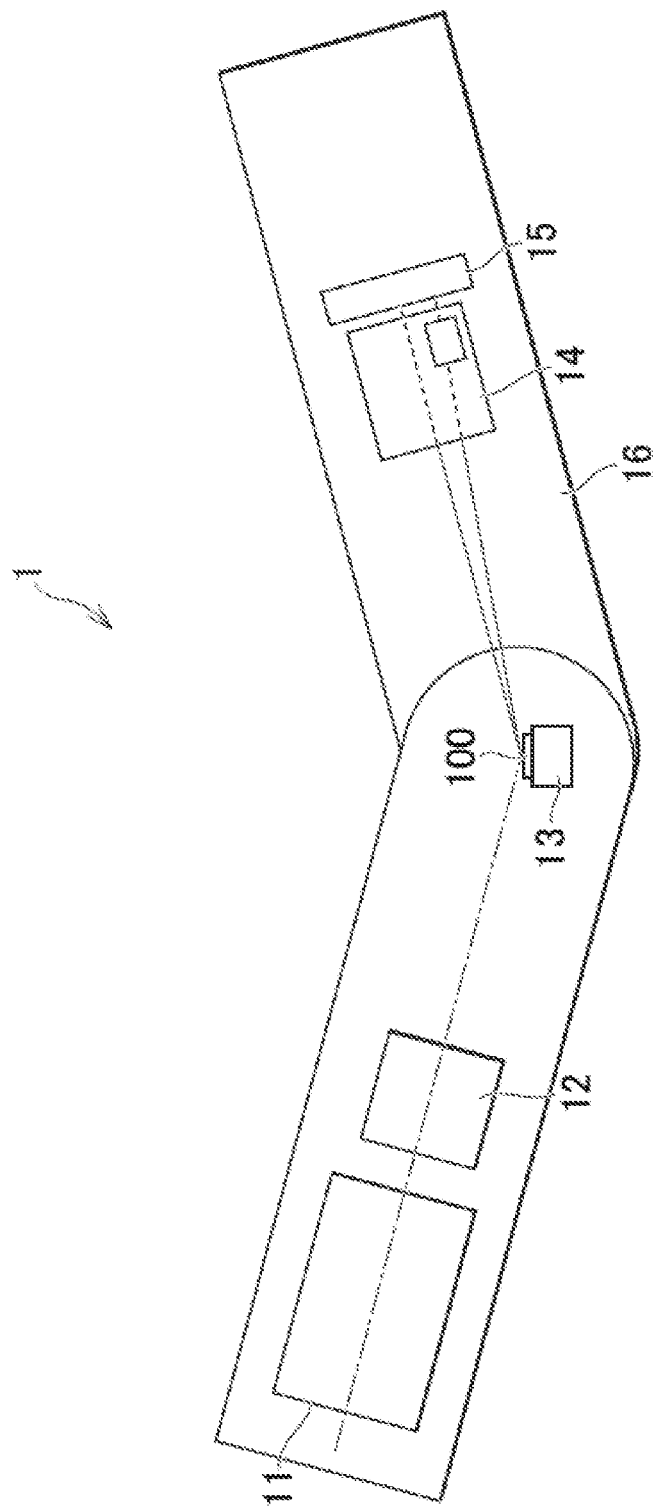
FIG. 1 is a schematic diagram showing a configuration of an X-ray analysis device according to an embodiment of the invention.

FIG. 1 is a schematic diagram showing a configuration of an X-ray analysis device 1 according to an embodiment of the invention. Here, the X-ray analysis device 1 according to the embodiment is an X-ray diffractometer (XRD), however, the device is not limited to that. The device may be another X-ray analysis device. The X-ray analysis device 1 according to the embodiment includes an X-ray source unit 11, an optical unit 12, a sample stage 13 that supports a sample 100, an analyzer unit 14, a two-dimensional detector 15, and a goniometer 16. The X-ray source unit 11 has a line X-ray source extending in directions in which the paper surface of FIG. 1 is perpendicularly penetrated. The optical unit 12 includes one or more optical components and is placed to collimate or converge and enter an X-ray generated from the X-ray source unit 11 into the sample 100. The goniometer 16 rotates the sample 100 (and the sample stage 13) by θ with respect to the X-ray source unit 11 and rotates the analyzer unit 14 and the two-dimensional detector 15 by 2θ with respect to the X-ray source unit 11. The goniometer 16 may be a horizontally sample mounted θ-θ goniometer or a θ-2θ goniometer. Note that the sample 100 is a semiconductor substrate including a multiquantum well semiconductor layer of GaN semiconductor, however, the sample is not limited to that.

Figure 2:
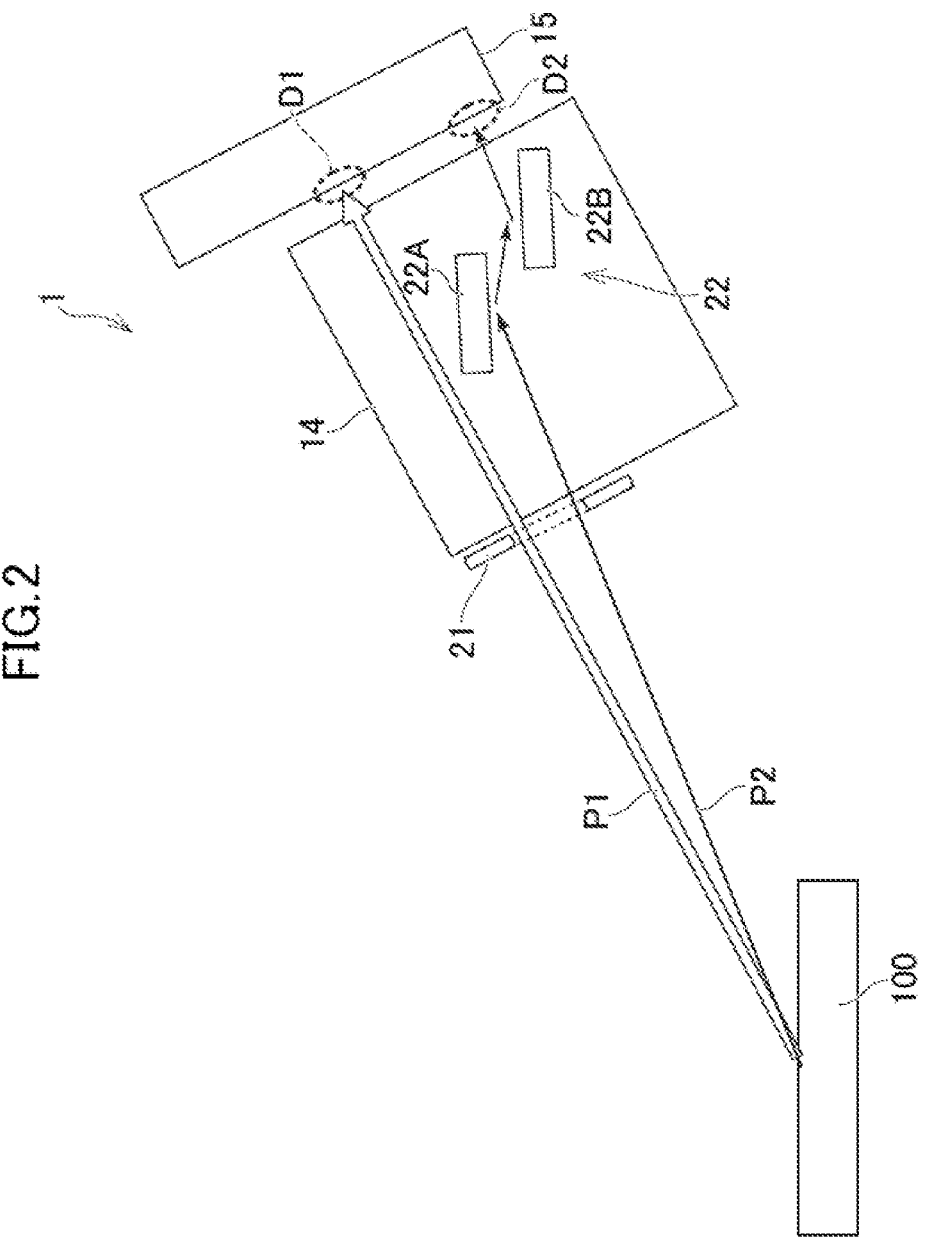
FIG. 2 is a schematic diagram showing a configuration of a main part of an X-ray analysis device according to the embodiment of the invention.

FIG. 2 is a schematic diagram showing a configuration of a main part of the X-ray analysis device 1 according to the embodiment. The analyzer unit 14 includes a slit 21 and an analyzer 22, and the analyzer 22 includes a two-crystal analyzer. The analyzer 22 contains two analyzer crystals opposed to each other (first analyzer crystal 22A and second analyzer crystal 22B). The first analyzer crystal 22A and the second analyzer crystal 22B respectively have reflection surfaces desirably parallel to each other. Here, Ge (germanium) single crystals using 220 reflection are employed for the respective analyzer crystals, however, the analyzer crystals are not limited to those. Appropriate other analyzer crystals may be used.

The two-dimensional detector 15 has a detection surface. The detection surface has a first detection area D1 and a second detection area D2, and the first detection area D1 and the second detection area D2 are placed apart. Each of the first detection area D1 and the second detection area D2 has one or more pixels, and an X-ray entering the first detection area D1 and an X-ray entering the second detection area D2 are distinguished for detection.

There are a plurality optical paths in which a diffracted X-ray (note that, in this specification, the diffracted X-ray includes a scattered X-ray) from the sample 100 travels, and there are two optical paths here. A first optical path P1 is an optical path in which the diffracted X-ray from the sample 100 linearly travels and directly reaches the first detection area D1. A second optical path P2 is an optical path in which the diffracted X-ray from the sample 100 is firstly reflected by the first analyzer crystal 22A, secondly reflected by the second analyzer crystal 22B, and reaches the second detection area D2. That is, in the second optical path P2, the X-ray is reflected at an even number of times (here twice) in one or more (here, two) analyzer crystals.

The X-ray analysis device 1 according to the embodiment is mainly characterized in that the analyzer 22 having the two analyzer crystals and the two-dimensional detector 15 are provided, and the two-dimensional detector 15 has the detection surface having the first detection area D1 for detection of the X-ray traveling in the first optical path P1 and the second detection area D2 for detecting the X-ray traveling in the second optical path P2. In related art, it is necessary to place an analyzer in an X-ray receiving side optical system for high-resolution measurement and it is necessary to make optical axis alignment of the X-ray at each time. Further, when the measurement is switched to low-resolution measurement, it is necessary to detach the analyzer and the labor increases. On the other hand, in the X-ray analysis device 1 according to the embodiment, the measurement may be switched between high-resolution measurement (measurement using the analyzer) and low-resolution measurement (measurement without using the analyzer) without placement (or removal) work of the analyzer. Further, in the X-ray analysis device 1 according to the embodiment, when the measurement is switched to one of the high-resolution measurement and the low-resolution measurement, it is not necessary to newly make optical axis alignment of the X-ray unless a failure occurs. Thereby, shortening of the measurement time and reduction of the measurement cost may be realized.

In the optical axis alignment and the measurement of the analyzer unit 14, the slit 21 is opened and both of the X-rays traveling in the first optical path P1 and the second optical path P2 pass through the slit 21. By the optical axis alignment of the analyzer unit 14, which will be described later, an offset angle of the first optical path P1 and the second optical path P2 and respective positions of the first detection area D1 and the second detection area D2 on the detection surface are determined. After the optical axis alignment of the analyzer unit 14 ends, the relative position of the analyzer 22 and the two-dimensional detector 15 is desirably fixed. The relative position of the analyzer 22 and the two-dimensional detector 15 is fixed, and thereby, even when the measurement without using the analyzer is switched to the measurement using the analyzer, displacement of the second detection area D2 (and the first detection area D1) is suppressed, the potential of occurrence of a failure is suppressed, and the necessity of newly performing the optical axis alignment of the X-ray is reduced.

The X-ray analysis device 1 according to the embodiment may make measurements in a plurality of modes described as below. A first mode is a zero-dimensional mode in which adjustment of the crystal orientation of the sample 100 or the like may be easily made by integration of all of X-ray intensity detected in the first detection area D1. A second mode is a one-dimensional mode. In the first detection area D1 or/and the second detection area D2, pixels arranged along a direction orthogonal to a line of intersection (this is referred to as "2θ-direction") between the detection surface of the two-dimensional detector 15 and the rotation surface of the goniometer 16 are integrated, and thereby, a measurement having position resolution with respect to the 2θ-direction may be made. A third mode is a two-dimensional mode. The X-ray intensity is detected in the respective all pixels in the first detection area D1 or/and the second detection area D2, and thereby, a measurement having position resolution in a planar direction of the detection surface may be made. Note that, in the one-dimensional mode, when the pixels are integrated along the direction orthogonal to the 2θ-direction, in the respective pixel groups to be integrated, integration is not limited to single pixels along the 2θ-direction are integrated but also a plurality of pixels providing local position resolution may be integrated. Similarly, in the two-dimensional mode, not only the detection of the X-ray intensity of the respective pixels but also, with a plurality of (e.g. 2×2=4) pixels providing local position resolution as a unit, the X-ray intensity detected by the plurality of pixels belonging to the respective units may be integrated. Switching among the plurality of modes may be executed without detachment of the analyzer 22. In the one-dimensional mode, high-speed measurement of a powder sample or thin film sample is realized.

As below, the method for optical axis alignment of the analyzer unit 14 will be explained. The optical axis alignment is performed, and thereby, the offset angle of the first optical path P1 and the second optical path P2 is identified and the respective positions of the first detection area D1 and the second detection area D2 on the detection surface are determined. As the determination of the positions, a position shift (offset) of (the center of) the second detection area D2 with respect to (the center of) the first detection area D1 may be determined. In related art, in the case of using a zero-dimensional detector, for switching between the measurement of the X-ray traveling in the first optical path P1 and the measurement of the X-ray traveling in the second optical path P2, to make one measurement, it is necessary to shut the X-ray for the other measurement using a slit placed between the analyzer unit and the zero-dimensional detector. On the other hand, in the X-ray analysis device 1 according to the embodiment, the measurements may be distinguished by the position difference in the detection area, and the slit is unnecessary. In other words, it may be considered that the two-dimensional detector 15 has a function of the slit and includes a virtual slit. The specific steps of optical axis alignment are as follows.

A first step is a step of preparing a test X-ray for optical axis alignment (X-ray preparation step). Specifically, without the sample 100 placed on the sample stage 13, the X-ray source unit 11 generates an X-ray.

A second step is a step of determining an angular placement as a reference of the first optical path P1 measurement (first optical path alignment step). The angle of the goniometer 16 is rotated and the angular placement as the reference is set, and an area that the X-ray traveling in the first optical path P1 in the angular placement enters is set as the first detection area D1. Here, the angular placement as the reference of the first optical path P1 measurement is desirably an angular placement in which the incident X-ray from the optical unit 12 to the sample stage 13 is aligned with the reflected X-ray from the sample stage 13 in a straight line, and the angular placement may be set at 2θ=0. Further, the first detection area D1 is desirably set to a vicinity of the center of the detection surface of the two-dimensional detector 15. When the X-ray is set to enter the origin (center) of the detection surface of the two-dimensional detector 15 in the angular placement at 2θ=0, the step is not necessarily executed.

A third step is a step of adjusting the placement and/or orientation of the two analyzer crystals (first analyzer crystal 22A and second analyzer crystal 22B) of the analyzer 22 to make the X-ray intensity detected by the two-dimensional detector 15 higher in an angular placement as a reference of the second optical path P2 measurement (second optical path adjustment step). At the step, first, the angle of the goniometer 16 is rotated by an angle calculated in advance (e.g. 2θ=3°) from the angular placement (2θ=0) as the reference of the first optical path P1 measurement determined at the second step to allow the X-ray traveling in the second optical path P2 to enter the detection surface of the two-dimensional detector 15. In the angular placement, the analyzer 22 is rotated, the placement and/or orientation of the analyzer 22 are adjusted so that the X-ray intensity detected by the two-dimensional detector 15 may be higher, and an area that the X-ray traveling in the second optical path P2 enters is set as the second detection area D2. In this regard, the detection surface contains the second detection area D2 and the second detection area D2 is separated from the first detection area D1. In this state, the angle of the goniometer 16 is rotated and the two-dimensional detector 15 is further moved to an angular placement in which the X-ray intensity detected by the two-dimensional detector 15 is higher. The angular placement is the angular placement as the reference of the second optical path P2 measurement, and a difference between the angular placement at 20 as the reference of the second optical path P2 measurement and the angular placement at 2θ=0 as the reference at the first optical path adjustment step is set as the offset angle. When the second optical path P2 measurement is performed, the angular placement at 20 as the reference of the second optical path measurement may be newly defined at 2θ=0 and scanning may be performed from 2θ=0. When the measurement is switched to the first optical path P1 measurement, the angular placement as the reference of the first optical path P1 measurement may be defined at 2θ=0 again without shift by the amount of the offset angle. The method for optical axis alignment of the analyzer unit 14 is described as above.

Figure 3:
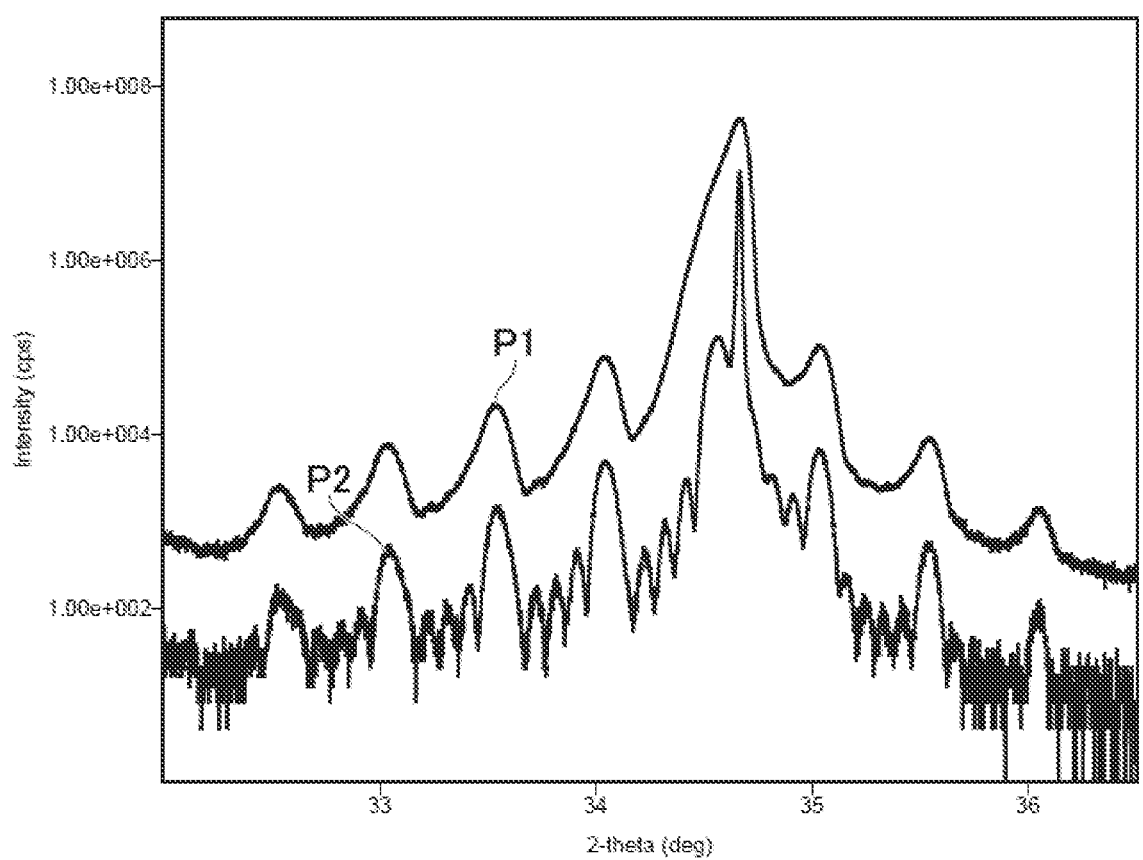
FIG. 3 shows measurement results of the X-ray analysis device according to the embodiment of the invention.

FIG. 3 shows measurement results of the X-ray analysis device 1 according to the embodiment. The horizontal axis of the graph indicates 2θ (°) and the vertical axis indicates X-ray intensity (cps). The measurement results shown in the graph are results of rocking curve measurements for the sample 100. In the graph, the result of the measurement by the first optical path P1 (without the analyzer 22) and the result of the measurement by the second optical path P2 (with the analyzer 22) are respectively shown. As shown in the graph, the result for the first optical path P1 is a result of a low-resolution measurement and vibration is observed in the X-ray intensity. The result for the second optical path P2 is a result of a high-resolution measurement and further minute vibration compared to the measurement result of the first optical path P1 is observed. As described above, whether or not the measurement system is accurately set may be checked by the low-resolution measurement (without analyzer) and the fine structure of the sample 100 may be observed by the high-resolution measurement (with analyzer).

The X-ray analysis device 1 according to the embodiment is optimum for the rocking curve measurement as shown in FIG. 3. Further, the device is also optimum for X-ray reflectivity (XRR) measurement and reciprocal space mapping (RSM) measurement, however, not limited to those. The device is desirable when the measurement is performed while switching between the low-resolution measurement (without analyzer) and the high-resolution measurement (with analyzer).

As above, the X-ray analysis device according to the embodiment of the invention is explained. In the above described embodiment, the line X-ray source is used, however, the source is not limited to that. A point X-ray source may be used. Further, the two-dimensional detector is used as a multidimensional detector, however, not limited to that. A one-dimensional detector may be used, that is, an N-dimensional detector (N is an integer of one or two) may be used. Furthermore, one or more analyzer crystals provided in the analyzer 22 are the two analyzer crystals and the second optical path P2 is reflected twice in the two analyzer crystals, however, not limited to those. For higher resolution measurement, four-crystal analyzer (four analyzer crystals) is desirably used and one or more analyzer crystals is desirably an even number of analyzer crystals. In this case, the optical path P2 is reflected at four times in the four analyzer crystals. The second optical path P2 is reflected at an even number of times in one or more analyzer crystals, and thereby, the X-ray entering the detection surface of the N-dimensional detector is converged by the detection surface.

In the analyzer unit 14 according to the embodiment, the analyzer 22 is placed in the second optical path P2, however, an analyzer 23 (not shown) may be further provided on the opposite side to the first optical path P1. The analyzer unit 14 includes the analyzer 23, and thereby, measurement of another third optical path P3 can be performed. In this case, the detection surface of the two-dimensional detector 15 has a third detection area D3 (not shown). The third detection area D3 is apart from the first detection area D1. The third optical path P3 is an optical path in which a scattered X-ray from the sample 100 is reflected by the analyzer 23 and reaches the third detection area D3. The third optical path P3 is line-symmetric to the second optical path P2 with respect to the first optical path P1, and the third detection area D3 is line-symmetric to the second detection area D2 with respect to the first optical path P1.

The invention claimed is:

1. An X-ray analysis device comprising:
a sample stage for supporting a sample;
an N-dimensional detector (N is an integer of one or two); and
an analyzer including one or more analyzer crystals,
wherein a detection surface of the N-dimensional detector has a first detection area and a second detection area placed apart from the first detection area and distinguished from the first detection area for detection,
a plurality of optical paths in which a diffracted X-ray from the sample travels includes a first optical path that directly reaches the first detection area and a second optical path that reaches via the one or more analyzer crystals, and
the N-dimensional detector performs a measurement of the first optical path by X-ray detection of the first detection area, and performs a measurement of the second optical path by X-ray detection of the second detection area.

2. The X-ray analysis device according to claim 1, wherein the second optical path is reflected at an even number of times in the one or more analyzer crystals.

3. The X-ray analysis device according to claim 1, wherein a relative position of the N-dimensional detector and the analyzer is fixed.

4. The X-ray analysis device according to claim 2, wherein a relative position of the N-dimensional detector and the analyzer is fixed.

5. A method for optical axis alignment of an X-ray analysis device including
an X-ray source,
a sample stage for supporting a sample,
an N-dimensional detector (N is an integer of one or two), and
an analyzer including one or more analyzer crystals,
wherein a detection surface of the N-dimensional detector having a first detection area and a second detection area placed apart from the first detection area and distinguished from the first detection area for detection, and
a plurality of optical paths in which a diffracted X-ray from the sample travels including a first optical path that directly reaches the first detection area and a second optical path that reaches via the one or more analyzer crystals,
the method comprising adjusting placement and/or orientation of the one or more analyzer crystals in an angular placement as a reference.

* * * * *